United States Patent
Gray et al.

(10) Patent No.: US 12,169,134 B1
(45) Date of Patent: *Dec. 17, 2024

(54) SYSTEMS AND METHODS FOR ROUTING VEHICLES

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Qunying Kou, San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge Lecocke, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,338

(22) Filed: Jul. 29, 2022

Related U.S. Application Data (63) Continuation of application No. 16/790,502, filed on Feb. 13, 2020, now Pat. No. 11,428,540.

(Continued)

(51) Int. Cl.
*G01C 21/34* (2006.01)
*G01C 21/36* (2006.01)

(52) U.S. Cl.
CPC ..... *G01C 21/3484* (2013.01); *G01C 21/3492* (2013.01); *G01C 21/3626* (2013.01); *G01C 21/3697* (2013.01)

(58) Field of Classification Search
CPC ............ G01C 21/3484; G01C 21/3492; G01C 21/3626; G01C 21/3697
See application file for complete search history.

(56) References Cited

U.S. PATENT DOCUMENTS

| 2017/0067749 A1 | 3/2017 | Golding et al. |
| 2017/0067750 A1 * | 3/2017 | Day .................. G01C 21/3461 |

(Continued)

FOREIGN PATENT DOCUMENTS

| DE | 102011084640 A1 | 4/2013 |
| DE | 102015001114 A1 * | 8/2015 ......... G01C 21/3484 |

(Continued)

OTHER PUBLICATIONS

Machine Translation of DE-102015001114-A1 (Year: 2015).*

(Continued)

*Primary Examiner* — Sahar Motazedi
(74) *Attorney, Agent, or Firm* — Fletcher Yoder, P.C.

(57) ABSTRACT

A tangible, non-transitory machine-readable medium includes machine-readable instructions that, when executed by one or more processors, cause the one or more processors to receive historical driver data indicative of one or more physiological parameters of one or more drivers during one or more prior driving trips, receive historical position data indicative of a respective position of a respective vehicle driven by the one or more drivers during the one or more prior driving trips, establish a correlation between the his- (Continued)

torical driver data and the historical position data, and identify one or more low-stress road segments using the correlation between the historical driver data and the historical position data.

18 Claims, 2 Drawing Sheets

Related U.S. Application Data (60) Provisional application No. 62/805,788, filed on Feb. 14, 2019.

(56) References Cited

U.S. PATENT DOCUMENTS

| | | |
|---|---|---|
| 2017/0370736 A1 | 12/2017 | Singh |
| 2018/0106633 A1* | 4/2018 | Chintakindi ....... G01C 21/3461 |
| 2018/0164108 A1 | 6/2018 | Rahal-Arabi et al. |
| 2018/0252543 A1 | 9/2018 | Chokshi et al. |
| 2019/0316922 A1 | 10/2019 | Petersen et al. |
| 2022/0034678 A1* | 2/2022 | Chintakindi ...... B60W 60/0051 |

FOREIGN PATENT DOCUMENTS

| | | | |
|---|---|---|---|
| GB | 2567854 A * | 5/2019 | ......... G01C 21/3453 |
| WO | 2017093440 A1 | 6/2017 | |
| WO | 2018009224 A1 | 1/2018 | |
| WO | WO-2018035317 A1 * | 2/2018 | .......... B60W 30/025 |
| WO | WO-2019202369 A1 * | 10/2019 | ............... A61B 5/01 |

OTHER PUBLICATIONS

Machine Translation of DE102011084640A1 (Year: 2013).*
"Cognitive System and Method to derive the least Stressful Navigational Route" (Year: 2017).*

* cited by examiner

SYSTEMS AND METHODS FOR ROUTING VEHICLES

CROSS-REFERENCE TO RELATED APPLICATIONS

This application is a Continuation of U.S. patent application Ser. No. 16/790,502, entitled "SYSTEMS AND METHODS FOR ROUTING VEHICLES," filed Feb. 13, 2020, which claims priority to U.S. Provisional Application No. 62/805,788, entitled "SYSTEMS AND METHODS FOR ROUTING VEHICLES," filed Feb. 14, 2019, which are hereby incorporated by reference in their entireties for all purposes.

BACKGROUND

The present disclosure relates generally to systems and methods for routing vehicles.

A system for routing vehicles may analyze current road conditions to output a recommended route to a destination. For example, the system may receive inputs of a starting location, a destination, and current traffic estimates. Based on these inputs, the system may determine and recommend a fastest route to the destination.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

SUMMARY

In an embodiment, a tangible, non-transitory machine-readable medium includes machine-readable instructions that, when executed by one or more processors, cause the one or more processors to receive historical driver data indicative of one or more physiological parameters of one or more drivers during one or more prior driving trips, receive historical position data indicative of a respective position of a respective vehicle driven by the one or more drivers during the one or more prior driving trips, establish a correlation between the historical driver data and the historical position data, and identify one or more low-stress road segments using the correlation between the historical driver data and the historical position data.

In an embodiment, a route planning system includes one or more processors that are configured to receive data indicative of low-stress road segments, receive a starting location for a driving trip to be completed by a driver of a vehicle, receive a destination for the driving trip, and determine a low-stress route from the starting location to the destination.

In an embodiment, a method of operating a route planning system includes receiving, at one or more processors, historical driver data indicative of one or more physiological parameters of one or more drivers during one or more prior driving trips. The one or more physiological parameters comprise heart rate, respiration rate, blood pressure, or any combination thereof. The method further includes receiving, at the one or more processors, historical position data indicative of a respective position of a respective vehicle driven by the one or more drivers during the one or more prior driving trips. The method further includes establishing, using the one or more processors, a correlation between the historical driver data and the historical position data. The method further includes identifying, using the one or more processors, one or more low-stress road segments using the correlation between the historical driver data and the historical position data and based on values of the one or more physiological parameters measured when the one or more drivers drive along the one or more low-stress road segments. The method further includes receiving, at the one or more processors, a starting location for a current driving trip and a destination for the current driving trip. The method further includes determining, using the one or more processors, a low-stress route from the starting location to the destination, wherein the low-stress route comprises at least one of the one or more low-stress road segments.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is now recognized that there is a need for improved systems and methods for routing vehicles along low-stress driving routes. Accordingly, the present embodiments are generally directed to a route planning system that may receive historical data (e.g., empirical data), which may include driver data related to one or more physiological parameters of a driver during a driving trip and corresponding position data of the vehicle during the driving trip. For example, the route planning system may receive the driver data via one or more sensors worn by the driver and the corresponding position data via a global positioning system (GPS) receiver of the vehicle.

In some embodiments, the route planning system may receive the historical data from multiple drivers and vehicles (e.g., hundreds, thousands, or more) over multiple driving trips (e.g., hundreds, thousands, or more). The route planning system may process the historical data to identify low-stress road segments (e.g., a portion of a single road, an entire road, a series of roads, groups of roads, and/or intersections). For example, the driver data and the position data may indicate that drivers tend to exhibit a stress response (e.g., high-stress or abnormal physiological parameters, such as an elevated heart rate) along a first road segment (e.g., a particular stretch of highway). Accordingly, the first road segment may not be categorized as a low-stress road segment and/or may be categorized as a high-stress road segment. However, the driver data and the position data may also indicate that drivers tend to exhibit no stress response or a low stress response (e.g., low-stress or normal physiological parameters, such as a heart rate within a range of a baseline) along a second road segment (e.g., a particular stretch of a feeder road along the highway). Accordingly, the second road segment may be categorized as a low-stress road segment.

In some embodiments, the route planning system may be used to determine and to provide a recommendation of a low-stress driving route to a destination. With reference to the above-noted example, the low-stress driving route may include the second road segment along the feeder road instead of the first road segment along the highway. In some embodiments, the low-stress driving route may include the second road segment instead of the first road segment, even if the resulting low-stress driving route is slower and/or longer than an alternative driving route that includes the first road segment.

In some embodiments, the route planning system may take other types of data (e.g., light conditions, weather conditions, traffic conditions, and/or construction conditions) into account to identify the low-stress road segments and/or to provide the recommendation of the low-stress driving route to the destination. With reference to the above-noted example, the historical data may indicate that the second road segment is only a low-stress road segment during the day, during dry weather conditions, during low traffic conditions, and/or in the absence of road construction. Accordingly, the low-stress driving route may include the second road segment along the feeder road instead of the first road segment along the highway only if the driver will travel to the destination during the day, during dry weather conditions, during low traffic conditions, and/or in the absence of road construction. The disclosed route planning system may provide many advantages and improvements (e.g., improvements in efficiency, such as processing efficiency) over other systems that are used to route vehicles. For example, because road segments are identified and categorized using at least some data that is previously obtained (e.g., prior to the current driving trip, such as the historical data, preferences of the driver, or the like), the disclosed route planning system may efficiently access information about road segments and efficiently generate a driving route (e.g., the low-stress driving route) for a driver.

Figure 1:
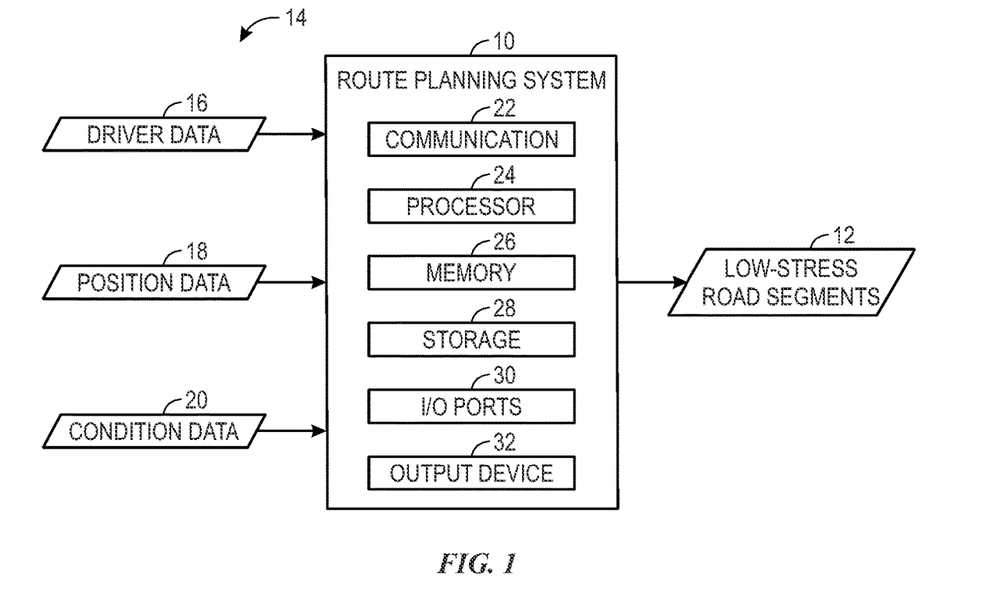
FIG. 1 is a block diagram of a route planning system, which may be used to identify low-stress road segments, in accordance with an embodiment of the present disclosure.

With the foregoing in mind, FIG. 1 is a block diagram of a route planning system 10 that may be used to identify low-stress road segments 12. The low-stress road segments 12 may include a portion of a single road, an entire road, a series of roads, groups of roads, and/or intersections, for example. To identify the low-stress road segments 12, the route planning system 10 may receive and process (e.g., using one or more algorithms) various types of historical data 14 (e.g., empirical data), such as driver data 16 related to one or more physiological parameters of a driver during a driving trip and corresponding position data 18 of the vehicle during the driving trip. The low-stress road segments 12 may generally be road segments over which the driver is not expected (e.g., predicted) to exhibit a stress response (e.g., a significant stress response; a change in one or more physiological parameters indicative of a stress response) and/or over which prior drivers have not exhibited a stress response.

As discussed in more detail below, the low-stress road segments 12 may be identified in any of a variety of ways. For example, a score (e.g., stress score) may be determined for each road segment available between a starting location and a destination. Then, the low-stress road segments 12 may be identified based on the relative scores for each of the road segments available between the starting location and the destination (e.g., the road segments with the lowest scores are identified as the low-stress road segments 12). In some such embodiments, other road segments may be identified as intermediate-stress road segments or high-stress road segments. Alternatively, in some embodiments, the low-stress road segments 12 may be identified only by their respective scores (e.g., any road segment with a score under a threshold may be identified as one of the low-stress road segments 12). Similarly, other road segments may be identified only by their respective scores (e.g., any road segment with a score over the threshold may be identified as a high-stress road segment).

The driver data 16 may be obtained via one or more sensors worn by the driver and may include a heart rate from a heart rate sensor, a respiration rate from a respiration rate sensor, and/or a blood pressure from a blood pressure sensor. The driver data 16 may additionally or alternatively be obtained via one or more sensors positioned within the vehicle, such as a heart rate from a heart rate sensor integrated into a steering wheel of the vehicle, a grip pressure from a pressure sensor integrated into the steering wheel of the vehicle, a body position from a pressure sensor integrated into a seat of the vehicle, eye movement from an image sensor (e.g., camera) in the vehicle, and/or sounds from a microphone in the vehicle. The heart rate, the respiration rate, the blood pressure, the grip pressure, the body position, the eye movement, and the sounds are physiological parameters that may be indicative of a stress response of the driver. For example, the heart rate, the respiration rate, and the blood pressure may increase during a stress response. Similarly, the grip pressure and the body position may relate to muscle tension, which may increase during a stress response. The eye movement (e.g., blinking) may also increase during a stress response or due to other stressful conditions, such as sunlight obscuring visualization of road signs. Certain types of sounds (e.g., shouting, loud volume due to passengers talking) may also increase during a stress response.

The position data 18 may be obtained by a global positioning system (GPS) receiver, which may be integrated into the vehicle or into a mobile device (e.g., mobile phone, tablet) carried by the vehicle during the driving trip. It should be appreciated that the driver data 16 and the position data 18 may include timing data (e.g., relative and/or absolute time) to enable the route planning system 10 to correlate the driver data 16 and the position data 18. The driver data 16 and the position data 18 may be provided to the route planning system 10 via any suitable communication techniques, including satellite communications, cellular communications, Bluetooth communications, and/or Wi-Fi communications. In some embodiments, the driver data 16 and/or the position data 18 may be communicated to the route planning system 10 continuously or periodically during the driving trip. In some embodiments, the driver data 16 and/or the position data 18 may be stored locally on the vehicle and/or on the mobile device during the driving trip and then subsequently communicated to the route planning system 10 at the end of the driving trip and/or in response to a communication network becoming available. In some embodiments, the driver data 16 and/or the position data 18 may be stored locally on the vehicle and/or on the mobile device during the driving trip and then subsequently communicated to the route planning system 10 upon instruction of the driver (e.g., the driver may provide an input at the vehicle and/or the mobile device to communicate the driver data 16 and/or the position data 18 to the route planning system 10).

The historical data 14 may be received from multiple drivers and vehicles (e.g., hundreds, thousands, or more) over multiple driving trips (e.g., hundreds, thousands, or more). The route planning system 10 may be configured to use the historical data 14 from the multiple drivers and vehicles to identify the low-stress road segments. The historical data 14 may be processed in any of a variety of ways to identify the low-stress road segments 12. The historical data 14 may be processed to categorize road segments (e.g., as low-stress road segments, high-stress road segments, and/or intermediate-stress road segments; rank the road segments, such as along a continuum of low-stress road segments or along a continuum between low-stress segments and high-stress road segments). The historical data 14 may be processed to categorize the road segments based on a percentage of drivers that exhibit a stress response (e.g., as indicated by values for one or more physiological parameters; as indicated by an absolute change or a percent change relative to a baseline for one or more physiological parameters) when traveling along the road segments. For example, if the driver data 16 indicates that greater than a threshold percentage (e.g., fifty percent) of the drivers traveling along a first road segment exhibit a stress response, the route planning system 10 may not categorize the first road segment as a low-stress road segment and/or may categorize the first road segment as a high-stress road segment. Similarly, if the driver data 16 indicates that less than the threshold percentage (e.g., fifty percent) of the drivers traveling along a second road segment do not exhibit a stress response, the route planning system 10 may categorize the second road segment as a low-stress road segment.

The historical data 14 may be processed to categorize road segments based on the values of the one or more physiological parameters measured when traveling along the road segments. For example, if the driver data 16 indicates that an average or median heart rate of the drivers traveling along a first road segment is greater than a heart rate threshold (e.g., 100 beats per minute), the route planning system 10 may not categorize the first road segment as a low-stress road segment and/or may categorize the first road segment as a high-stress road segment. Similarly, if the driver data 16 indicates that the average or median heart rate of the drivers traveling along a second road segment is less than the heart rate threshold (e.g., 100 beats per minute), the route planning system 10 may categorize the second road segment as a low-stress road segment.

The historical data 14 may be processed to categorize road segments based on changes (e.g., relative to a baseline) in the one or more physiological parameters measured when traveling along the road segments. For example, if the driver data 16 indicates that an average or median change in the heart rate of the drivers (e.g., relative to respective baselines) traveling along a first road segment exceeds a threshold percentage (e.g., ten percent), the route planning system 10 may not categorize the first road segment as a low-stress road segment and/or categorize the first road segment as a high-stress road segment. Similarly, if the driver data 16 indicates that an average or median change in the heart rate of the drivers traveling along a second road segment is less than the threshold percentage (e.g., ten percent), the route planning system 10 may categorize the second road segment as a low-stress road segment.

The drivers may be categorized based on driver characteristics. In some such cases, only historical data 14 from other drivers that share the same driver characteristics as the driver is used to categorize the road segments for the driver and/or each road segment is placed in different categories for different types of drivers (e.g., drivers having different driving characteristics). Thus, a particular road segment may be categorized as a low-stress road segment for one driver, and the particular road segment may not be categorized as a low-stress road segment for another driver. In this way, the low-stress road segments are customized for the driver even while using the historical data 14 for multiple different drivers. For example, the historical data 14 for the driver and/or inputs from the driver may indicate one or more driver characteristics of the driver, such as that the driver tends to experience a stress response in fast-moving traffic. Accordingly, the route planning system 10 may only use the historical data 14 from other drivers that share the same one or more driver characteristics (e.g., a stress response in fast-moving traffic) to categorize the road segments. The driver characteristics may include driving-related factors (e.g., stress response in fast-moving traffic; stress response in slow-moving traffic) and/or other factors, such as age, gender, residence location (e.g., city, state), and/or baseline physiological parameters (e.g., baseline heart rate).

The road segments may be ranked or ordered along a continuum of low-stress road segments and/or along a continuum between low-stress road segments and high-stress road segments. In some such cases, the road segments may be ranked or ordered based on the percentage of drivers that exhibit the stress response and/or the severity of the stress response (e.g., as indicated by values of and/or changes in the one or more physiological parameters). Thus, in an example, the first road segment may be ranked as a relatively higher-stress road segment as compared to the second road segment if the driver data 16 indicates that approximately a first driver percentage (e.g., twenty percent) of the drivers traveling along the first road segment exhibit a stress response and/or the stress response is marked by a first parameter percentage (e.g., ten percent) increase in heart rate, while approximately a second, lower driver percentage (e.g., ten percent) of the drivers traveling along the second road segment exhibit a stress response and/or the stress response is marked by a second, lower parameter percentage (e.g., five percent) increase in heart rate. In some embodiments, the route planning system 10 may assign a score to each of the road segments, such as a numerical value (e.g., on a scale of 1 to 10) indicative of a stress level associated with the road segment. It should be appreciated that the historical data 14 may be processed in various other ways to determine the low-stress road segments 12 and that, where appropriate, the driver data 16 may be calibrated (e.g., normalized) to account for baseline variations between drivers (e.g., variations in resting heart rate, breathing rate, blood pressure, grip pressure, body position, eye movement, sound).

In some embodiments, the route planning system 10 may take additional types of historical data 14 into account to identify the low-stress road segments 12. For example, the route planning system 10 may receive condition data 20, which may include light conditions, weather conditions, traffic conditions, and/or construction conditions during the driving trip. The condition data 20 may be received from any of a variety of sources, such as one or more databases or data services. The one or more databases or data services may include a weather data service, a news data service, various electronic news sources that may be updated in real time or near real time (e.g., news websites, social media websites), and/or information collection organizations that acquire data. Additionally or alternatively, the condition data 20 may be received from one or more sensors on the vehicle. For example, the light conditions may be detected via light detection sensors (e.g., optical sensors, imaging sensors or cameras) on the vehicle. However, it should be appreciated that the light conditions may be deduced based at least in part on the timing data (e.g., absolute time of day and/or time of year) received with the driver data 16 and the position data 18. As another example, the weather conditions (e.g., rainy weather conditions) may be detected via sensors (e.g., rain sensors) on the vehicle and/or the traffic conditions (e.g., stopped or slow moving traffic) may be detected via sensors (e.g., speed sensors) on the vehicle. It should be appreciated that the condition data 20 may include timing data (e.g., relative and/or absolute time) to enable the route planning system 10 to correlate the driver data 16, the position data 18, and the condition data 20.

The condition data 20 may be used to categorize road segments. For example, the driver data 16 may indicate that the first road segment should only be omitted from the low-stress road segments and/or categorized as a high-stress road segment at night, during rainy weather conditions, during heavy traffic conditions, and/or during road construction. Similarly, the driver data 16 may indicate that the second road segment is only a low-stress road segment during daylight, during dry weather conditions, during low traffic conditions, and/or in the absence of road construction. The driver data 16 may also indicate that the rank or order of the first road segment and the second road segment along the continuum changes based on various conditions. For example, the first road segment may be ranked as a relatively higher-stress road segment as compared to the second road segment at night. However, the first road segment may be ranked as a relatively lower-stress road segment as compared to the second road segment during rainy weather conditions.

To facilitate these techniques, the route planning system 10 may include various processing components. As shown, the route planning system 10 includes a communication component 22, a processor 24, a memory 26, a storage 28, input/output (I/O) ports 30, an output device 32 (e.g., a display or a speaker), or any of a variety of other components. The communication component 22 may be a wireless or wired communication component that may facilitate communication between the one or more sensors, the GPS receiver, the one or more databases or data services, and/or other computing systems (e.g., a user device, such as a mobile device or personal computer; mapping system). For example, the communication component 22 may communicate the low-stress road segments 12 (and possibly related data, such as categorization, rank, order, and/or score of road segments) to a mapping system, which may then use the information to generate maps for drivers.

The processor 24 may be any suitable type of computer processor or microprocessor capable of executing computer-executable code. The processor 24 may also include multiple processors that may perform the operations described herein. The memory 26 and the storage 28 may represent non-transitory computer-readable media (e.g., any suitable form of memory or storage) that may store the processor-executable code used by the processor 24 to perform various techniques described herein. These articles of manufacture may represent computer-readable media (e.g., any suitable form of memory or storage) that may store the processor-executable code used by the processor 24 to perform the presently disclosed techniques. The memory 26 and the storage 28 may also be used to store the data (e.g., the driver data 16, the position data 18, the condition data 20, the low-stress road segments 12), various other software applications, and the like. It should be noted that non-transitory merely indicates that the media is tangible and not a signal.

The I/O ports 30 may be interfaces that may couple to other peripheral components such as input devices (e.g., keyboard, mouse), input/output (I/O) modules, and the like. The output device 32 may operate to depict indications associated with software or executable code processed by the processor 24. The output device 32 may be any suitable type of display, such as a liquid crystal display (LCD), plasma display, or an organic light emitting diode (OLED) display, for example. In one embodiment, the output device 32 may be an input device. For example, the output device 32 may include a touch display capable of receiving inputs from the driver or other user of the route planning system 10.

It should be noted that the components described above with regard to the route planning system 10 are exemplary components and the route planning system 10 may include additional or fewer components as shown. Additionally, it should be noted that the route planning system 10 may be a cloud-computing system and/or a distributed computing system. For example, the driver data 16, the position data 18, and the condition data 20 may be processed via the processor 24 at a server remote from the vehicle, while the output device 32 may be located within the vehicle to enable the driver to visualize outputs of the route planning system 10 and/or to provide inputs to the route planning system 10.

Figure 2:
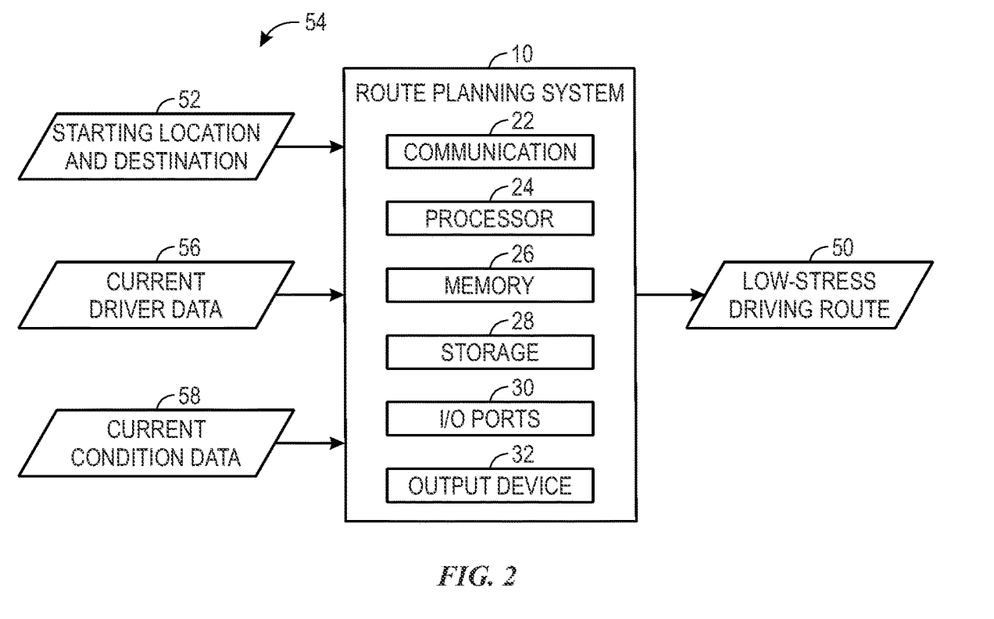
FIG. 2 is a block diagram of a route planning system, which may be used to determine a low-stress route to a destination, in accordance with an embodiment of the present disclosure.

FIG. 2 is a block diagram of the route planning system 10 that may be used to determine a low-stress driving route 50 (e.g., recommended driving route; low-stress route) to a destination. The route planning system 10 is configured to identify and/or store the low-stress road segments 12 as discussed above with respect to FIG. 1 and also to determine the low-stress driving route 50 to the destination. However, in some embodiments, the route planning system 10 may merely receive the low-stress road segments 12 (and possibly related data, such as categorization, rank, and/or score of road segments) as an input from a database or another system, and then use the low-stress road segments 12 to determine the low-stress driving route 50 to the destination.

In operation, the route planning system 10 may determine the low-stress driving route 50 to the destination based on the low-stress road segments 12 (FIG. 1) and an input of a starting location and the destination 52 from the driver. For example, the driver may input the starting location and the destination 52 via the output device 32, which may be a touch screen display in the vehicle or on a mobile device. Then, the route planning system 10 may identify the low-stress road segments 12 along various available routes to the destination. The route planning system 10 may generate the low-stress driving route 50 using only road segments categorized as the low-stress road segments 12 or using as many low-stress road segments 12 as possible. The route planning system 10 may generate the low-stress driving route 50 to exclude any road segments categorized as high-stress road segments or to exclude as many such high-stress road segments as possible. The route planning system 10 may generate the low-stress driving route 50 using only road segments with scores below a threshold. The route planning system 10 may generate the low-stress driving route 50 using a combination of road segments that provides an overall lowest score (e.g., a sum, average, or median of the respective scores for each road segment). Furthermore, as discussed in more detail below, the route planning system 10 may not create an entirely new route to the destination, but instead may merely modify the fastest and/or the shortest route to the destination by replacing only certain road segments in the fastest and/or the shortest route with the low-stress road segments 12 (e.g., replacing one high-stress road segment with one low-stress road segment 12).

In some embodiments, the route planning system 10 may receive and process current driver data 56, which may include data indicative of a sensitivity level of the driver and/or preferences of the driver. For example, certain drivers may have conditions (e.g., heart conditions, anxiety conditions) that make the drivers more sensitive to high-stress situations and/or that make the drivers more amenable to taking the low-stress driving route 50 even if the low-stress driving route 50 may take significantly more time (e.g., as compared to a fastest and/or shortest route). The data indicative of the sensitivity level of the driver may be physiological data obtained via one or more sensors (e.g., the heart rate sensor, the respiration rate sensor, the blood pressure sensor, or any other sensors disclosed herein) and/or input by the driver (e.g., via the output device 32).

The sensitivity level of the driver may be used alone or in combination with the driver characteristics described above to categorize drivers. Then, only historical data from other drivers that share the same sensitivity level and/or driver characteristics as the driver is used to categorize the road segments for the driver and/or each road segment is placed in different categories for different types of drivers (e.g., drivers having different sensitivity levels and/or driving characteristics). In this way, the low-stress road segments are customized for the driver and the low-stress driving route 50 may be customized for the driver. Such information may also be used to normalize data for general use for all drivers. For example, the sensitivity level and/or the driver characteristics may be taken into account to normalize the historical data 14 prior to identifying the low-stress road segments (e.g., for all drivers).

In some embodiments, the route planning system 10 may receive the data and may determine the sensitivity level of the driver (e.g., via assigning a sensitivity score, which may be a numerical value on a scale, such as a scale of 1 to 10). For example, drivers with a high resting heart rate (e.g., over 100 beats per minute), drivers that exhibit large changes in heart rate and/or other physiological parameters during driving trips (e.g., as evidenced by the driver data 16 [FIG. 1]), and/or drivers that provide an input identifying themselves as having a high sensitivity level may be determined to have a high sensitivity level. In some embodiments, the route planning system 10 may automatically set parameters (e.g., permissible time delays over the fastest and/or shortest route; thresholds, such as score thresholds) based on the sensitivity level of the driver. For example, for drivers determined to have a high sensitivity level, the route planning system 10 may generate the low-stress driving route 50 using only road segments categorized as the low-stress road segments 12 or using as many low-stress road segments 12 as possible, regardless of the increase in time to reach the destination (e.g., as compared to the fastest and/or shortest route). Or the route planning system 10 may generate the low-stress driving route 50 using only road segments with scores below a threshold, and the threshold may vary based on the sensitivity level of the driver (e.g., the threshold may be a score of 8 for a driver with a low sensitivity score, and the threshold may be a score of 2 for a driver with a high sensitivity score).

The current driver data 56 may include more specific preferences of the driver (e.g., input via the output device 32). The preferences of the driver may include preferences to always use the fastest route, the shortest route, or the low-stress driving route 50; to use a certain type of routes at certain times of days and/or on certain days of the week; to use a commonly used route and/or road segments; and/or to use a certain type of route for a particular driving trip (e.g., to reach the destination). The preferences may include preferences related to thresholds (e.g., a preferred threshold for the scores for the road segments used to generate the low-stress driving route 50) and/or time delays. For example, the driver may input a preference to always use the fastest route unless the low-stress driving route 50 only increases the time to reach the destination by less than an amount or percentage (e.g., less than a threshold or maximum preferred time delay). In such cases and in other cases, the route planning system 10 may determine the fastest route to the destination and may identify that a first road segment in the fastest route is categorized as a high-stress road segment or is otherwise not categorized as a low-stress segment. The route planning system 10 may also determine that a second road segment proximate to the first road segment is a low-stress road segment, and the route planning system 10 may modify the fastest route to include the second road segment instead of the first road segment, as long as the modification only increases the time to reach the destination by less than the amount or percentage.

In some embodiments, the route planning system 10 may take additional types of current data 54 into account to determine the low-stress driving route 50. For example, the route planning system 10 may receive the current condition data 58, which may include light conditions, weather conditions, traffic conditions, and/or construction conditions along road segments between the starting location and the destination 52. The current condition data 58 may be received from any of a variety of sources, such as the one or more databases or data services and/or the one or more sensors discussed above with respect to FIG. 1.

As discussed above, the road segments may be categorized, ranked, ordered, and/or scored based on the condition data 20. For example, the second road segment may only be categorized as a low-stress road segment during daylight, during dry weather conditions, during low traffic conditions, and/or in the absence of road construction. Accordingly, the low-stress driving route 50 may only consider the second road segment to be a low-stress road segment if the driver will use the vehicle to travel to the destination during the day, during dry weather conditions, during low traffic conditions, and/or in the absence of road construction.

It should be appreciated that the current data 54 may be used in various other ways to generate the low-stress driving route 50. For example, the current driver data 58 and the condition data 20 may be analyzed together to generate the low-stress driving route 50 having low-stress road segments 12 that include only moving traffic (e.g., no stop-and-go traffic) or that include as much moving traffic as possible (e.g., within other constraints, such as while meeting preferences for time delays and/or score values for the low-stress road segments 12). In some embodiments, the low-stress driving route 50 may be generated to route the vehicle through moving traffic where the driver has expressed a preference for moving traffic (e.g., a sensitivity to stop-and-go traffic, such as due to having young children who prefer movement and/or due to stress related to excessive fuel consumption).

Additionally, in certain situations, no low-stress road segments 12 may be available (e.g., at rush hour and/or in bad weather conditions all available road segments have a respective score that exceeds a threshold), all of the available low-stress road segments 12 may have the same score, no low-stress driving routes 50 may be available, and/or all of the low-stress driving routes 50 may have the same overall score. In such cases, the route planning system 10 may generate an alternative route that is the fastest route, the shortest route, or the most-commonly driven route (e.g., based on the historical data; by the driver; by all drivers).

Figure 3:
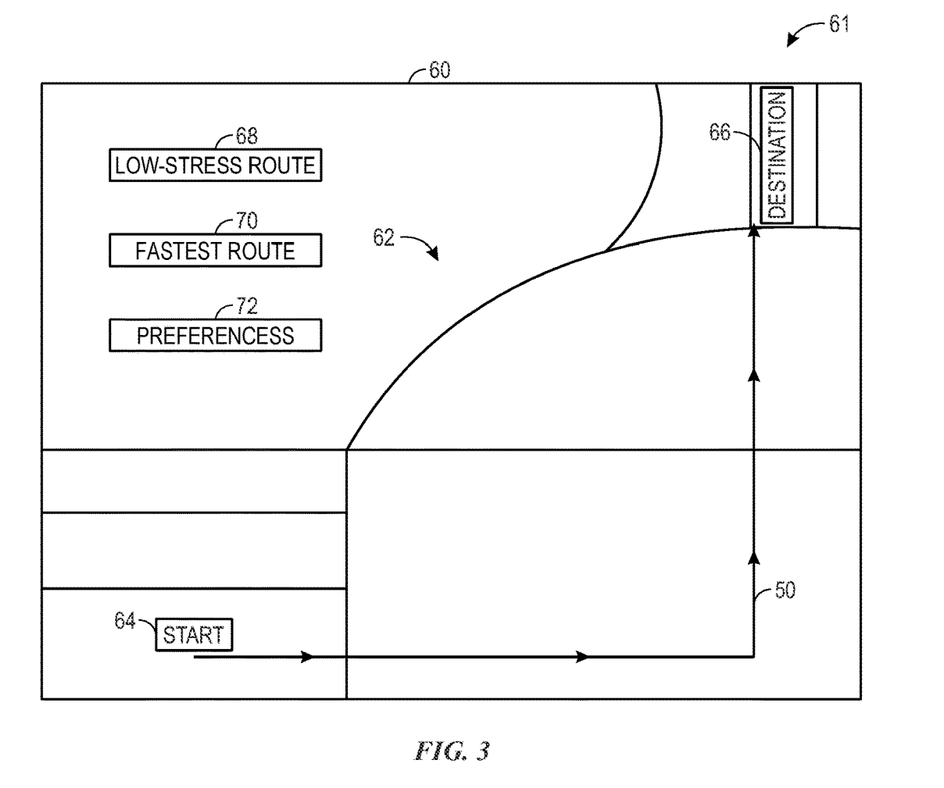
FIG. 3 illustrates a graphical user interface (GUI) including a map with a low-stress route to a destination, in accordance with an embodiment of the present disclosure.

FIG. 3 illustrates a display screen 60 displaying a graphical user interface (GUI) 61 including a map 62 of the low-stress driving route 50 from a starting location 64 to a destination 66. The display screen 60 may be the output device 32 of the route planning system 10 or may be part of another system in communication with the route planning system 10. The display screen 60 may include virtual buttons (e.g., touch-screen buttons), such as a first virtual button 68 that enables the driver to request display of the low-stress driving route 50, a second virtual button 70 that enables the driver to request display of a fastest and/or a shortest route, and a third virtual button 72 that enables the driver to request display of the current driver data 56, such as the sensitivity level and/or the preferences. For example, upon selection of the third virtual button 72, the display screen 60 may display the driver's sensitivity level and/or the driver's previously selected preferences, and the display screen 60 may enable the driver to make changes to the driver's sensitivity level and/or the preferences.

Additionally or alternatively, any of the other data disclosed herein may be presented to the driver via the GUI 61. For example, data related to the one or more physiological parameters, the scores associated with each road segment, the scores associated with the driving route(s), a difference between the scores associated with the driving routes, the estimated distances and/or times associated with the driving route(s), a difference between the estimated distances and/or times associated with the driving routes, or the like, may be presented to the driver via the GUI 61.

Figure 4:
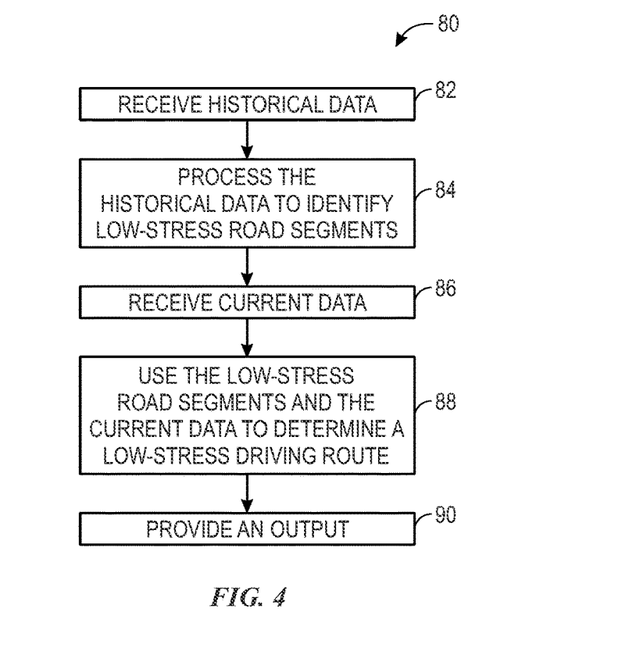
FIG. 4 illustrates a flow chart of a method of operating a route planning system to identify low-stress road segments and to determine a low-stress route to a destination, in accordance with an embodiment of the present disclosure.

FIG. 4 is a flow chart of a method 80 of operation of the route planning system 10. The following description of the method 80 will be described as being performed by the route planning system 10, but it should be noted that any suitable processor-based device may be specially programmed to perform any of the steps of the method 80 described herein. Moreover, although the following description of the method 80 is described in a particular order, it should be understood that the steps of the method 80 may be performed in any suitable order, certain steps of the method 80 may be omitted, and other steps may be added to the method 80.

In step 82, the route planning system 10 may receive the historical data 14, such as the driver data 16, the position data 18, and/or the condition data 20. The driver data 16 may include one or more physiological parameters and may be obtained via one or more sensors worn by the driver and/or via other types of sensors described herein. The position data 18 may be obtained by a GPS receiver of the vehicle or via a mobile device carried by the vehicle during the driving trip. It should be appreciated that the driver data 16 and the position data 18 may include timing data (e.g., relative and/or absolute time) to enable the route planning system 10 to correlate the driver data 16 and the position data 18. The condition data 20 may include light conditions, weather conditions, traffic conditions, and/or construction conditions during the driving trip. The condition data 20 may be obtained via various data services and/or sensors, and it should be appreciated that the condition data 20 may include timing data (e.g., relative and/or absolute time) to enable the route planning system 10 to correlate the driver data 16, the position data 18, and the condition data 20.

In step 84, the route planning system 10 may process the historical data 14 to identify the low-stress road segments 12. As discussed herein, the low-stress road segments 12 may be identified in any of a variety of ways. For example, the route planning system 10 may be configured to identify low-stress road segments 12 and to carry out the techniques disclosed herein for each driver based only on the historical data 14 for the driver obtained over multiple driving trips. The route planning system 10 may be configured to identify the low-stress road segments based on the historical data 14 from multiple drivers and vehicles over multiple driving trips.

The historical data 14 may be processed to categorize road segments (e.g., as low-stress road segments, high-stress road segments, and/or intermediate-stress road segments; rank the road segments, such as along a continuum of low-stress road segments or along a continuum between low-stress segments and high-stress road segments). The historical data 14 may be processed to categorize the road segments based on a percentage of drivers that exhibit a stress response when traveling along the road segments. The historical data 14 may be processed to categorize road segments based on the values of the one or more physiological parameters measured when traveling along the road segments. The historical data 14 may be processed to categorize road segments based on changes (e.g., relative to a baseline) in the one or more physiological parameters measured when traveling along the road segments.

It should be appreciated that the road segments may be ranked or ordered based on the percentage of drivers that exhibit the stress response and/or the severity of the stress response (e.g., as indicated by values of and/or changes in the one or more physiological parameters). As noted above, the route planning system 10 may consider driver characteristics to categorize the road segments for the driver. The route planning system 10 may assign a score to each of the road segments, such as a numerical value (e.g., on a scale of 1 to 10) indicative of a stress level associated with the road segment.

In step 86, the route planning system 10 may receive current data 54, such as the starting location and destination 52, the current driver data 56, and/or the current condition data 58. For example, the driver may input the starting location and the destination 52 via the output device 32, which may be a touch screen display in the vehicle or on a mobile device. In step 88, the route planning system 10 may use the low-stress road segments 12 (and possibly related data, including categorization, rank, order, and/or score of road segments) and the current data 54 to determine the low-stress driving route 50 between the starting location and destination 52.

The route planning system 10 may generate the low-stress driving route 50 using only road segments categorized as the low-stress road segments 12 or using as many low-stress road segments 12 as possible. The route planning system 10 may generate the low-stress driving route 50 to exclude any road segments categorized as high-stress road segments or to exclude as many such high-stress road segments as possible. The route planning system 10 may generate the low-stress driving route 50 using only road segments with scores below a threshold. The route planning system 10 may generate the low-stress driving route 50 using a combination of road segments that provides an overall lowest score (e.g., a sum, average, or median of the respective scores for each road segment). Furthermore, the route planning system 10 may not create an entirely new route to the destination, but instead may merely modify the fastest and/or the shortest route to the destination by replacing only certain road segments in the fastest and/or the shortest route with the low-stress road segments 12. As discussed above, the route planning system 10 may consider a sensitivity level of the driver and/or preferences of the driver to generate the low-stress driving route 50.

In step 90, the low-stress driving route 50 may be output to the driver of the vehicle, such as via displaying the GUI 61 on the display screen 60. As discussed above, the GUI 61 may present multiple different driving routes (e.g., the low-stress driving route 50 and one or more other driving routes, such as a fastest and/or shortest driving route) the first virtual button 68 that enables the driver to request display of the low-stress driving route 50, the second virtual button 70 that enables the driver to request display of a fastest and/or a shortest route, and the third virtual button 72 that enables the driver to request display of the current driver data 56, such as the sensitivity level and/or the preferences. Additional details of the method 80 may be understood with reference to the description of FIGS. 1-3.

While certain embodiments relate to collecting the historical data 14 from multiple drivers and vehicles over multiple driving trips to determine the low-stress road segments 12 and/or to determine the low-stress driving route 50, it should be appreciated that the techniques disclosed herein may be carried out to determine personalized, driver-specific low-stress road segments 12 and/or personalized, driver-specific low-stress driving route 50. For example, the historical data 14 may be obtained for a single driver over multiple driving trips, and this historical data 14 (e.g., only the historical data 14 from the single driver) may then be used to identify the personalized, driver-specific low-stress road segments 12. Similarly, the personalized, driver-specific low-stress road segments 12 may then be used to determine the personalized, driver-specific low-stress driving route 50. Such techniques may be particularly relevant for a driver with multiple available routes between a common starting location (e.g., home) and a common destination (e.g., work). For example, the driver may take different routes from the starting location to the destination over time, and the route planning system 10 may obtain and process the driver data 16, the position data 18, and/or the condition data 20 during these driving trips. Then, the route planning system 10 may provide the driver with the personalized, driver-specific low-stress driving route 50 from the starting location to the destination so that the driver can then be aware of and/or know which of the multiple available routes is the low-stress driving route 50 for the driver.

It should also be appreciated that the techniques disclosed herein may be adapted for use with autonomous vehicles (e.g., self-driving vehicles). Although the driver of an autonomous vehicle may not necessarily drive or control the autonomous vehicle as the autonomous vehicle travels to the destination, the driver (e.g., occupant or passenger in the autonomous vehicle) may experience stress responses during the driving trip. Accordingly, the driver (e.g., occupant or passenger in the autonomous vehicle) may be monitored (e.g., to obtain the driver data 16). Similarly, the position data 18 and/or the condition data 20 may be correlated to the driver data 16 to determine the low-stress road segments 12 and/or the autonomous vehicle may be directed by the route planning system 10 and/or may be guided (e.g., via control systems of the autonomous vehicles, per the instructions from the route planning system 10) to travel along the low-stress driving routes 50.

While only certain features of the disclosure have been illustrated and described herein, many modifications and changes will occur to those skilled in the art. It is, therefore, to be understood that the appended claims are intended to cover all such modifications and changes as fall within the true spirit of the invention.

What is claimed is:

1. A tangible, non-transitory machine-readable medium comprising machine-readable instructions that, when executed by one or more processors, cause the one or more processors to perform operations comprising:

receive current driver data comprising a sensitivity level of a driver of a vehicle and a preference of the driver of the vehicle;

identify one or more low-stress road segments;

assign a respective score to each of the one or more low-stress road segments, wherein the respective score is indicative of a respective stress level for each of the one or more low-stress road segments;

select one or more appropriate low-stress road segments from the one or more low-stress road segments based on the respective score of each of the one or more low-stress road segments and the current driver data to assemble one or more low-stress routes from a starting location to a destination;

determine a respective total low stress-score for each of the one or more low-stress routes based on the respective score assigned to each of the one or more appropriate low-stress road segments;

display, via a display screen, a graphical user interface (GUI) with a map comprising the one or more low-stress routes, the respective total low stress-score for each of the one or more low-stress routes, and a plurality of buttons;

display, via the display screen, (i) a respective low-stress route of the one or more low-stress routes on the map for visualization by the driver in response to a first user input via a first button of the plurality of buttons, (ii) a fastest route and a shortest route in response to a second user input via a second button of the plurality of buttons, and (iii) the sensitivity level in response to a third user input via a third button of the plurality of buttons; and control the vehicle with the driver to travel along a selected low-stress route of the one or more low-stress routes.

2. The tangible, non-transitory machine-readable medium of claim 1, wherein the machine-readable instructions, when executed by the one or more processors, further cause the one or more processors to:

receive historical driver data indicative of one or more physiological parameters of the driver during one or more prior driving trips;

receive historical position data indicative of a respective position of the vehicle driven by the driver during the one or more prior driving trips; and identify the sensitivity level of the driver by correlating the historical driver data and the historical position data.

3. The tangible, non-transitory machine-readable medium of claim 2, wherein the historical driver data comprises heart rate data, respiration rate data, blood pressure data, a grip pressure, a body position, eye movement, sounds, or any combination thereof.

4. The tangible, non-transitory machine-readable medium of claim 2, wherein the machine-readable instructions, when executed by the one or more processors, cause the one or more processors to identify the one or more low-stress road segments based on values of the one or more physiological parameters measured when the driver drives along the one or more low-stress road segments.

5. The tangible, non-transitory machine-readable medium of claim 2, wherein the historical driver data is further indicative of one or more respective physiological parameters of additional drivers during respective prior driving trips, and the historical position data is further indicative of respective positions of respective vehicles driven by the additional drivers during the respective prior driving trips.

6. The tangible, non-transitory machine-readable medium of claim 1, wherein the preference of the driver comprises a time delay threshold, a score threshold, or a combination thereof.

7. The tangible, non-transitory machine-readable medium of claim 1, wherein the current driver data further comprises driver characteristics comprising an age of the driver, a gender of the driver, one or more baseline physiological parameters, or a combination thereof.

8. The tangible, non-transitory machine-readable medium of claim 1, wherein the machine-readable instructions, when executed by the one or more processors, further cause the one or more processors to determine the sensitivity level of the driver based on a change in one or more physiological parameters measured during one or more prior driving trips.

9. The tangible, non-transitory machine-readable medium of claim 1, wherein the machine-readable instructions, when executed by the one or more processors, further cause the one or more processors to:
adjust the sensitivity level, the preference, or both based on an additional user input;
assemble the one or more low-stress routes based on the adjusted sensitivity level, the adjusted preference, or both; and
update the GUI with the one or more low-stress routes.

10. The tangible, non-transitory machine-readable medium of claim 1, wherein the machine-readable instructions, when executed by the one or more processors, further cause the one or more processors to:
identify the one or more low-stress road segments based on the current driver data and condition data comprising weather conditions and light conditions.

11. The tangible, non-transitory machine-readable medium of claim 1, wherein the machine-readable instructions, when executed by the one or more processors, further cause the one or more processors to:
update the preference of the driver based on an additional user input, wherein the preference comprises a time delay threshold between a low-stress route and a fastest route.

12. A route planning system comprising:
one or more processors configured to:
receive historical driver data indicative of one or more physiological parameters of a driver of a vehicle during one or more prior driving trips;
determine a sensitivity level of the driver based on the historical driver data;
identify a plurality of road segments;
determine a respective score for each of the plurality of road segments, wherein the respective score is indicative of a respective stress level for each of the plurality of road segments;
select one or more appropriate road segments from the plurality of road segments based on the respective scores and the sensitivity level to assemble one or more personalized low-stress routes from a starting location to a destination;
determine a respective total low stress-score for each of the one or more personalized low-stress routes based on the respective score for each of the one or more appropriate road segments;
display, via a display screen, a graphical user interface (GUI) with a map comprising the one or more personalized low-stress routes, the respective total low stress-score for each of the one or more personalized low-stress routes, and a plurality of buttons;
display, via the display screen, (i) a respective personalized low-stress route of the one or more personalized low-stress routes on the map for visualization by the driver in response to a first user input via a first button of the plurality of buttons, (ii) a fastest route and a shortest route in response to a second user input via a second button of the plurality of buttons, and (iii) the sensitivity level in response to a third user input via a third button of the plurality of buttons; and
control the vehicle to travel along a selected personalized low-stress route of the one or more personalized low-stress routes.

13. The route planning system of claim 12, wherein the one or more processors are further configured to set a score threshold based on the sensitivity level of the driver and the respective score for each of the one or more appropriate road segments is below the score threshold.

14. The route planning system of claim 12, wherein the one or more processors are further configured to receive a preference of the driver and to select the one or more appropriate road segments further based on the preference.

15. A method of operating a route planning system, the method comprising:
receiving, at one or more processors, historical driver data indicative of one or more physiological parameters of a driver during one or more prior driving trips, wherein the one or more physiological parameters comprise heart rate, respiration rate, blood pressure, or any combination thereof;
determining, using the one or more processors, a sensitivity level of the driver based on the historical driver data;
identifying, using the one or more processors, a plurality of road segments based on the historical driver data;
determining, using the one or more processors, a respective score for each of the plurality of road segments, wherein the respective score is indicative of a respective stress level for each of the plurality of road segments;
selecting, using the one or more processors, one or more appropriate road segments from the plurality of road segments based on the respective scores and the sensitivity level to assemble one or more personalized low-stress routes from a starting location to a destination;

determining, using the one or more processors, a respective total low-stress score for each of the one or more personalized low-stress routes;

displaying, using the one or more processors and a display within a vehicle, a graphical user interface (GUI) with a map comprising the one or more personalized low-stress routes, the respective total low-stress score for each of one or more personalized low-stress routes, and a plurality of buttons;

displaying, using the one or more processors and the display, (i) a respective personalized low-stress route of the one or more personalized low-stress routes on the map for visualization by the driver in response to a first user input via a first button of the plurality of buttons, (ii) a fastest route and a shortest route in response to a second user input via a second button of the plurality of buttons, and (iii) the sensitivity level in response to a third user input via a third button of the plurality of buttons; and controlling, using the one or more processors, the vehicle to travel along a selected personalized low-stress route of the one or more personalized low-stress routes.

16. The method of claim 15, further comprising:
receiving, at the one or more processors, historical position data indicative of a respective position of the vehicle driven by the driver during the one or more prior driving trips;
establishing, using the one or more processors, a correlation between the historical driver data and the historical position data; and
determining, using the one or more processors, the respective scores based on the correlation.

17. The method of claim 15, further comprising:
receiving, at the one or more processors, a time delay threshold that defines an acceptable time difference between a low-stress route and a fastest route; and
assembling, using the one or more processors, the one or more personalized low-stress routes based on the respective scores, the sensitivity level, and the time delay threshold.

18. The method of claim 15, further comprising:
receiving, at the one or more processors, condition data comprising weather conditions and light conditions from a data service, a sensor coupled to the vehicle, or both; and
identifying, using the one or more processors, the plurality of road segments based on the historical driver data and the condition data.

* * * * *